United States Patent
Wagner

(10) Patent No.: US 10,002,026 B1
(45) Date of Patent: Jun. 19, 2018

(54) ACQUISITION AND MAINTENANCE OF DEDICATED, RESERVED, AND VARIABLE COMPUTE CAPACITY

(71) Applicant: Amazon Technologies, Inc., Seattle, WA (US)

(72) Inventor: Timothy Allen Wagner, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days. days.

(21) Appl. No.: 14/977,503

(22) Filed: Dec. 21, 2015

(51) Int. Cl.
*G06F 9/50* (2006.01)
*G06F 9/455* (2018.01)

(52) U.S. Cl.
CPC ........ *G06F 9/5055* (2013.01); *G06F 9/45558* (2013.01); *G06F 2009/4557* (2013.01); *G06F 2009/45595* (2013.01); *G06F 2209/503* (2013.01); *G06F 2209/506* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 4,949,254 A | 8/1990 | Shorter | |
| 5,283,888 A | 2/1994 | Dao et al. | |
| 5,970,488 A | 10/1999 | Crowe et al. | |
| 6,708,276 B1 | 3/2004 | Yarsa et al. | |
| 7,036,121 B1 | 4/2006 | Casabona et al. | |
| 7,665,090 B1 | 2/2010 | Tormasov et al. | |
| 7,707,579 B2 | 4/2010 | Rodriguez | |
| 7,730,464 B2 | 6/2010 | Trowbridge | |

(Continued)

FOREIGN PATENT DOCUMENTS

EP 2663052 A1 11/2013
WO WO 2009/137567 A1 11/2009

(Continued)

OTHER PUBLICATIONS

Anonymous: "Docker run reference", Dec. 7, 2015, XP055350246, Retrieved from the Internet: URL:web.archive.org/web/20151207111702/https://docs.docker.com/engine/reference/run/ [retrieved on Feb. 28, 2017].

(Continued)

*Primary Examiner* — Abu Zar Ghaffari
(74) *Attorney, Agent, or Firm* — Knobbe, Martens, Olson & Bear, LLP

(57) ABSTRACT

A system for providing low-latency computational capacity from a virtual compute fleet is provided. The system may be configured to maintain a plurality of virtual machine instances on one or more physical computing devices, wherein the plurality of virtual machine instances comprises a first pool comprising a first sub-pool of virtual machine instances and a second sub-pool of virtual machine instances, and a second pool comprising virtual machine instances used for executing one or more program codes thereon. The first sub-pool and/or the second sub-pool may be associated with one or more users of the system. The system may be further configured to process code execution requests and execute program codes on the virtual machine instances of the first or second sub-pool.

21 Claims, 8 Drawing Sheets

(56) References Cited

U.S. PATENT DOCUMENTS

| | | |
|---|---|---|
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | Deval et al. |
| 8,065,676 B1 | 11/2011 | Sahai et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,336,079 B2 | 12/2012 | Budko et al. |
| 8,429,282 B1 | 4/2013 | Ahuja |
| 8,448,165 B1 | 5/2013 | Conover |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,719,415 B1* | 5/2014 | Sirota .................... G06F 9/5061 |
| | | 709/221 |
| 8,725,702 B1 | 5/2014 | Raman et al. |
| 8,756,696 B1 | 6/2014 | Miller |
| 8,769,519 B2 | 7/2014 | Leitman et al. |
| 8,806,468 B2 | 8/2014 | Meijer et al. |
| 8,819,679 B2 | 8/2014 | Agarwal et al. |
| 8,825,964 B1 | 9/2014 | Sopka et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 6/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,223,966 B1 | 12/2015 | Satish et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 2002/0172273 A1 | 11/2002 | Baker et al. |
| 2003/0071842 A1 | 4/2003 | King et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1* | 9/2006 | Jackson ................ G06F 9/5027 |
| | | 709/226 |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0255604 A1 | 11/2007 | Seelig |
| 2008/0028409 A1 | 1/2008 | Cherkasova et al. |
| 2008/0082977 A1 | 4/2008 | Araujo et al. |
| 2008/0104247 A1* | 5/2008 | Venkatakrishnan .. G06F 9/5083 |
| | | 709/226 |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Amir Husain |
| 2009/0013153 A1* | 1/2009 | Hilton .................... G06F 9/5077 |
| | | 712/29 |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0288084 A1* | 11/2009 | Astete .................... G06F 9/45533 |
| | | 718/1 |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1* | 3/2010 | Kacin .................... G06F 9/45537 |
| | | 719/317 |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0131572 A1* | 6/2011 | Elyashev ............ G06F 9/45533 |
| | | 718/1 |
| 2011/0134761 A1 | 6/2011 | Smith |
| 2011/0141124 A1 | 6/2011 | Halls et al. |
| 2011/0153727 A1* | 6/2011 | Li ........................ G06F 9/5055 |
| | | 709/203 |
| 2011/0153838 A1 | 6/2011 | Belkine et al. |
| 2011/0154353 A1 | 6/2011 | Theroux et al. |
| 2011/0184993 A1 | 7/2011 | Chawla et al. |
| 2011/0185355 A1* | 7/2011 | Chawla ................ G06F 9/5077 |
| | | 718/1 |
| 2011/0225277 A1* | 9/2011 | Freimuth ............ G06F 9/45558 |
| | | 709/223 |

(56) References Cited

U.S. PATENT DOCUMENTS

| | | |
|---|---|---|
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1* | 9/2012 | Miller ............... G06Q 30/0601 713/168 |
| 2012/0331113 A1 | 12/2012 | Jain et al. |
| 2013/0014101 A1* | 1/2013 | Ballani ............... H04L 67/101 718/1 |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1* | 2/2013 | Lubsey ............... G06F 9/5072 718/1 |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1* | 6/2013 | Luna ............... H04W 28/02 709/213 |
| 2013/0179574 A1 | 7/2013 | Calder et al. |
| 2013/0179881 A1* | 7/2013 | Calder ............... G06F 9/5072 718/1 |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1* | 8/2013 | Yasuda ............... H04L 41/0813 709/222 |
| 2013/0227563 A1 | 8/2013 | Mcgrath |
| 2013/0227641 A1* | 8/2013 | White ............... H04L 63/20 726/1 |
| 2013/0232480 A1 | 9/2013 | Winterfeldt et al. |
| 2013/0239125 A1 | 9/2013 | Iorio |
| 2013/0263117 A1 | 10/2013 | Konik et al. |
| 2013/0275975 A1 | 10/2013 | Masuda et al. |
| 2013/0290538 A1* | 10/2013 | Gmach ............... G06F 9/50 709/226 |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1* | 12/2013 | Barjatiya ............... H04L 63/0209 726/13 |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1* | 10/2014 | Maeda ............... G06F 11/3604 726/22 |
| 2014/0380085 A1 | 12/2014 | Rash et al. |
| 2015/0039891 A1 | 2/2015 | Ignatchenko et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1* | 4/2015 | Melander ............ G06F 9/45537 718/1 |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1* | 9/2015 | Greden ............... G06F 9/5044 718/1 |
| 2015/0289220 A1 | 10/2015 | Kim et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378764 A1 | 12/2015 | Sivasubramanian et al. |
| 2015/0378765 A1 | 12/2015 | Singh et al. |
| 2016/0012099 A1 | 1/2016 | Tuatini et al. |
| 2016/0072727 A1 | 3/2016 | Leafe et al. |
| 2016/0092250 A1 | 3/2016 | Wagner et al. |
| 2016/0098285 A1 | 4/2016 | Davis et al. |
| 2016/0100036 A1 | 4/2016 | Lo et al. |
| 2016/0140180 A1 | 5/2016 | Park et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0364265 A1 | 12/2016 | Cao et al. |
| 2016/0371127 A1* | 12/2016 | Antony ............... G06F 9/5077 |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |

(56) References Cited

U.S. PATENT DOCUMENTS

FOREIGN PATENT DOCUMENTS

| WO | WO 2015/078394 A1 | 6/2015 |
|---|---|---|
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Adapter Pattern, Wikipedia, en.wikipedia.org/w/index.php?title=Adapter_pattern&oldid=654971255, [retrieved May 26, 2016], 6 pages.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-aService Applications Over Cloud Computing Infrastructures, Future Generation Computer Systems, vol. 29, pp. 273-286, 2013.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Preliminary Report on Patentability in PCT/US2015/052810 dated Apr. 4, 2017.

International Search Report and Written Opinion in PCT/US2015/052838 dated Dec. 18, 2015.

International Preliminary Report on Patentability in PCT/US2015/052838 dated Apr. 4, 2017.

International Search Report and Written Opinion in PCT/US2015/052833 dated Jan. 13, 2016.

International Preliminary Report on Patentability in PCT/US2015/052833 dated Apr. 4, 2017.

International Search Report and Written Opinion in PCT/US2015/064071dated Mar. 16, 2016.

International Preliminary Report on Patentability in PCT /U52015/064071 dated Jun. 6, 2017.

International Search Report and Written Opinion in PCT/U52016/016211 dated Apr. 13, 2016

International Search Report and Written Opinion in PCT/US2016/026514 dated Jun. 8, 2016.

International Search Report and Written Opinion in PCT/US2016/026520 dated Jul. 5, 2016.

International Search Report and Written Opinion in PCT/US2016/054774 dated Dec. 16, 2016.

International Search Report and Written Opinion in PCT/US2016/066997 dated Mar. 20, 2017.

International Search Report and Opinion in PCT/US/2017/023564 dated Jun. 6, 2017.

Amazon, "AWS Lambda: Developer Guide", Retrieved from the Internet, Jun. 26, 2016, URL : docs.aws.amazon.com/lambda/ latest/dg/lambda-dg.pdf.

Ben-Yehuda et al., "Deconstructing Amazon EC2 Spot Instance Pricing", ACM Transactions on Economics and Computation 1.3, 2013, 15 pages.

Hoffman, Auto scaling your website with Amazon Web Services (AWS)—Part 2, Cardinalpath, Sep. 2015, 15 pages.

International Preliminary Report on Patentability in PCT/US2016/016211 dated Aug. 17, 2017.

International Preliminary Report on Patentability in PCT/US2016/026514 dated Oct. 10, 2017.

International Preliminary Report on Patentability in PCT/US2016/026520 dated Oct. 10, 2017.

International Search Report and Written Opinion in PCT/US2017/040054 dated Sep. 21, 2017.

International Search Report and Written Opinion in PCT/US2017/039514 dated Oct. 10, 2017.

Balazinska et al., Moirae: History-Enhanced Monitoring, Published: 2007, 12 pages.

Das et al., Adaptive Stream Processing using Dynamic Batch Sizing, 2014, 13 pages.

\* cited by examiner

US 10,002,026 B1

ACQUISITION AND MAINTENANCE OF DEDICATED, RESERVED, AND VARIABLE COMPUTE CAPACITY

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
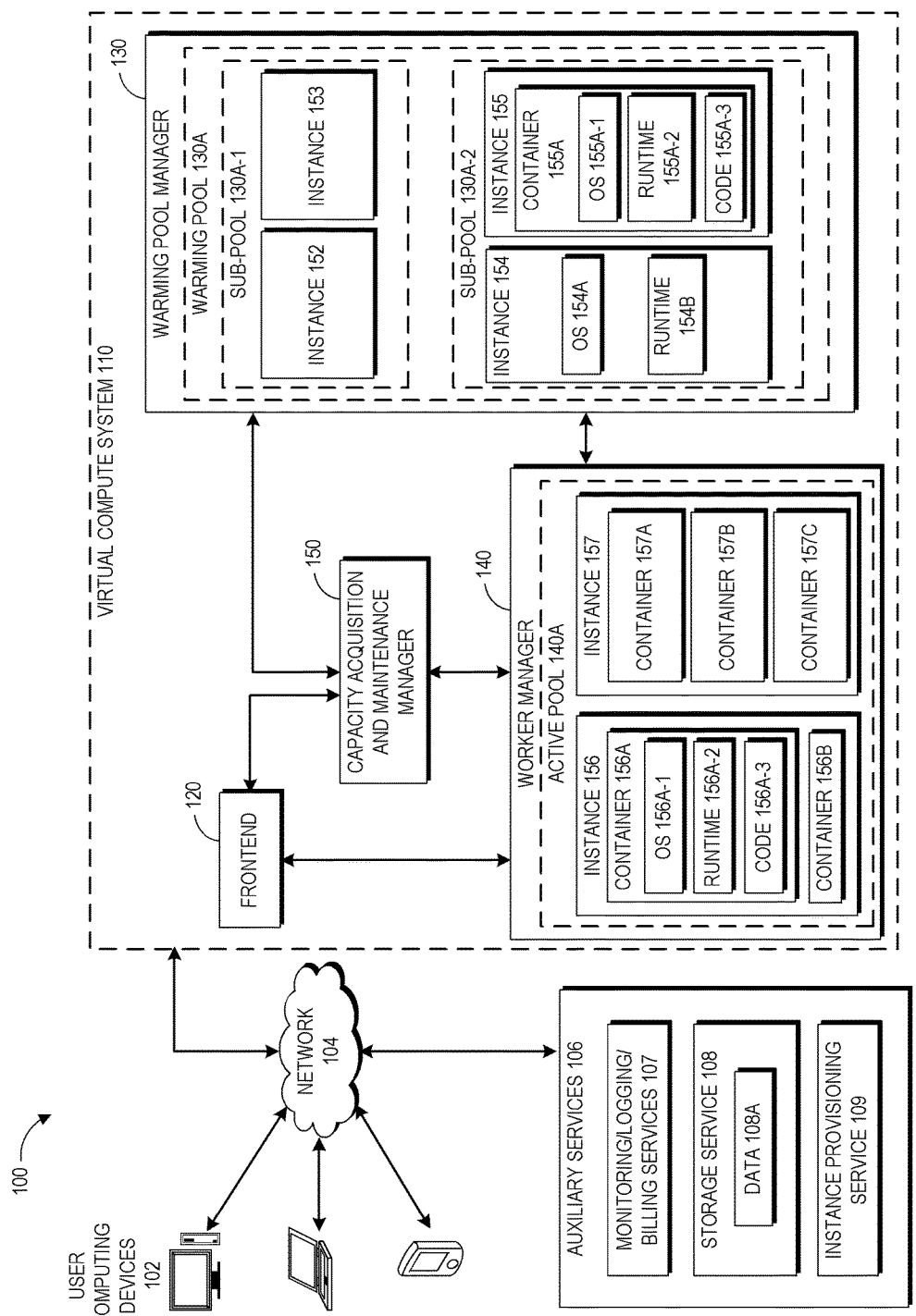
FIG. 1 is a block diagram depicting an illustrative environment for providing low latency compute capacity, according to an example aspect.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices, and may contain operating systems and applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds.

In some cases, there may be virtual compute systems that acquire and manage such virtual computing resources and provide compute capacity to users on a per-request basis.

Such virtual compute systems may maintain a group of virtual machine instances (also referred to herein as a virtual compute fleet or a pool of virtual machine instances) and configure one or more of such virtual machine instances to service incoming code execution requests (e.g., by executing user code in one or more containers created on the virtual machine instances). However, the security guarantees provided by some of such virtual compute systems may be insufficient, especially for handling requests and/or data related to the healthcare industry or other industries in which compliance with various privacy and security rules is critical or even mandatory. For example, the Security Rule of Health Insurance Portability and Accountability Act of 1996 (HIPAA) requires that covered entities maintain appropriate administrative and technical safeguards to ensure that electronic personal health information managed by such entities is adequately protected. Some existing virtual compute systems may use the same underlying hardware to serve multiple users (e.g., to execute user codes, to store and manage user data, etc.). For example, the same multi-tenanted hardware may be used to implement one virtual machine instance assigned to one user and another virtual machine instance assigned to another user. In such a case, there is a greater risk that the security of the sensitive information stored for one of those users may be compromised, either intentionally or inadvertently, by the other user.

Further, some existing virtual compute systems may provide limited options for customizing code execution based on user needs (e.g., latency, amount and nature of workload, cost, error rate, etc.). For example, some users may wish to prioritize cost over latency, and other users may wish to prioritize workload over error rate. For such users, rigid code execution schemes provided by some existing virtual compute systems may be insufficient.

Thus, an improved method of providing compute capacity that can be reserved for specific users and/or customized for specific user needs is desired.

According to aspects of the present disclosure, by maintaining multiple sub-pools of pre-initialized virtual machine instances that are segregated at the hardware level (e.g., by providing a collection of single-tenanted hardware), data security can be improved and/or regulatory compliance may be facilitated. Further, by acquiring virtual machine instances from a variety of sources each having different resource constraints (e.g., cost, availability, etc.), the virtual compute system according to some embodiments of the present disclosure can provide a flexible code execution environment that can be customized based on user needs.

Generally described, aspects of the present disclosure relate to the acquisition and maintenance of compute capacity (e.g., virtual machine instances) that can be used to service code execution requests. Specifically, systems and methods are disclosed which facilitate the acquisition and maintenance of virtual machine instances in a warming pool for pre-warming the virtual machine instances by loading one or more software components (e.g., operating systems, language runtimes, libraries, etc.) thereon. The warming pool may include one or more sub-pools of virtual machine instances that are each configured to handle different users, program codes, needs, etc. Maintaining such a pool of virtual machine instances may involve creating a new instance, acquiring a new instance from an external instance provisioning service, destroying an instance, assigning/re-assigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can service the requests (e.g., by executing the user code in one or more containers created on the virtual machine instances) is significantly reduced.

In another aspect, a virtual compute system may maintain several different types of compute capacity in the warming pool. For example, the warming pool may include a sub-pool of virtual machine instances that are used to execute program codes of only one designated user. Such a sub-pool of virtual machine instances may be implemented on single-tenanted hardware (e.g., physical servers) that is not used for any user other than the designated user, thereby providing improved data security. Additionally or alternatively, the warming pool may include a sub-pool of virtual machines instances that are associated with various resource constraints (e.g., the number of servers, duration, price, etc.). The resource constraints may be utilized to provide customized compute capacity to users. For example, a price-conscious user may request low-cost compute capacity that may have lower availability, and a performance-driven user may request high-availability compute capacity that may have a higher cost. Additionally or alternatively, the warming pool may include a sub-pool of virtual machine instances that is configured to provide a fixed amount of total compute capacity to a designated user. For example, such a sub-pool may include virtual machine instances that are reserved for use by the designated user (e.g., a user who has a predictable workload), thereby ensuring that the designated user can utilize burst capacity that is equal to at least the reserved amount.

Specific embodiments and example applications of the present disclosure will now be described with reference to the drawings. These embodiments and example applications are intended to illustrate, and not limit, the present disclosure.

Illustrative Environment Including Virtual Compute System

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces (UIs), command-line interfaces (CLIs), application programming interfaces (APIs), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a UI, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, a worker manager 140, and a capacity acquisition and maintenance manager 150 (hereinafter "capacity manager 150"). In the depicted example, virtual machine instances ("instances") 152, 153, 154, 155 are shown in a warming pool 130A managed by the warming pool manager 130, and instances 156, 157 are shown in an active pool 140A managed by the worker manager 140. The instances 152, 153 are maintained in a sub-pool 130A-1, and the instances 154, 155 are maintained in a sub-pool 130A-2. The illustration of the various components within the virtual compute system 110 is logical in nature and one or more of the components can be implemented by a single computing device or multiple computing devices. For example, the instances 152-157 can be implemented on one or more physical computing devices in different various geographic regions. Similarly, each of the frontend 120, the warming pool manager 130, the worker manager 140, and the capacity manager 150 can be implemented across multiple physical computing devices. Alternatively, one or more of the frontend 120, the warming pool manager 130, the worker manager 140, and the capacity manager 150 can be implemented on a single physical computing device. In some embodiments, the virtual compute system 110 may comprise multiple frontends, multiple warming pool managers, multiple worker managers, and/or multiple capacity managers. Although six virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool, two sub-pools within the warming pool, and a single active pool are shown in the example of FIG. 1, the embodiments described herein are not limited as such, and one skilled in the art will appreciate that the virtual compute system 110 may comprise any number of warming pools, active pools, and sub-pools in the warming pool(s) and active pool(s).

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume of code execution requests that the user needs handled, thereby relieving the user from the burden of having to worry about over-utilization (e.g., acquiring too little computing resources and suffering performance issues) or under-utilization (e.g., acquiring more computing resources than necessary to run the codes, and thus overpaying).

Frontend

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console UI). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the UI provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

Warming Pool Manager

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (also referred to herein as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions. In some embodiments, the warming pool 130A may be divided into multiple sub-pools as illustrated in FIG. 1.

As shown in FIG. 1, instances may have operating systems (OS) and/or language runtimes loaded thereon. The instance 154 includes an OS 154A and a runtime 154B. In some embodiments, as illustrated by instance 155 of FIG. 1, the instances in the warming pool 130A may also include containers (which may further contain copies of operating systems, runtimes, user codes, etc.), which are described in greater detail below. Although the instances 154, 155 are shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

As shown in FIG. 1, the warming pool 130A includes the sub-pools 130A-1 and 130A-2. The sub-pool 130A-1 includes the instances 152, 153, and the sub-pool 130A-2 includes the instances 154, 155. Although in the example of FIG. 1, the warming pool 130A includes two sub-pools, the embodiments of the present disclosure are not limited as such and may include a single sub-pool, more than two sub-pools, or any other number of sub-pools.

In some embodiments, the sub-pool 130A-1 includes compute capacity (e.g., virtual machine instances) that can be used to service code execution requests associated with any user of the virtual compute system 110. For example, upon receiving a code execution request associated with user A, the virtual compute system 110 can configure the instance 152 according to the received code execution request, add the instance 152 to the active pool 140A, execute the code in the instance 152, tear down the instance 152, and use the same capacity to service the code execution requests associated with another user.

In some embodiments, the sub-pool 130A-2 includes compute capacity that is dedicated to a particular user and can be used only for that user. For example, upon receiving a code execution request associated with the particular user to whom the sub-pool 130A-2 is assigned, the virtual compute system 110 can use the instance 155 (which already has the code 155A-3 associated with the request) to service the request. In some embodiments, the sub-pool 130A-2 is implemented on physically isolated hardware that is not shared with any other user of the virtual compute system 110.

Although not illustrated in FIG. 1, the warming pool 130A may include one or more other sub-pools that include different types of compute capacity that can be used to satisfy different user needs/goals. For example, the warming pool 130A may include a sub-pool of instances that have lower resource constraints than other on-demand instances but may be prone to interruptions or outright loss of capacity. These other types of compute capacity are described in greater detail below.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a UI provided by the virtual compute system 110, the UI may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); scheduling information (e.g., the time by which the virtual compute system is requested to execute the program code, the time after which the virtual compute system is requested to execute the program code, the temporal window within which the virtual compute system is requested to execute the program code, etc.), etc.

Worker Manager

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In the example illustrated in FIG. 1, user codes are executed in isolated compute systems referred to as containers. Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance).

As shown in FIG. 1, instances may have operating systems (OS), language runtimes, and containers. The containers may have individual copies of the OS and the language runtimes and user codes loaded thereon. In the example of FIG. 1, the active pool 140A managed by the worker manager 140 includes the instances 156, 157. The instance 156 has containers 156A, 156B. The container 156A has OS 156A-1, runtime 156A-2, and code 156A-3 loaded therein. In the depicted example, the container 156A has its own OS, runtime, and code loaded therein. In one embodiment, the OS 156A-1 (e.g., the kernel thereof), runtime 156A-2, and/or code 156A-3 are shared among the containers 156A, 156B (and any other containers not illustrated in FIG. 1). In another embodiment, the OS 156A-1 (e.g., any code running outside the kernel), runtime 156A-2, and/or code 156A-3 are independent copies that are created for the container 156A and are not shared with other containers on the instance 156. In yet another embodiment, some portions of the OS 156A-1, runtime 156A-2, and/or code 156A-3 are shared among the containers on the instance 156, and other portions thereof are independent copies that are specific to the container 156A. The instance 157 includes containers 157A, 157B, 157C.

In the example of FIG. 1, the sizes of the containers depicted in FIG. 1 may be proportional to the actual size of the containers. For example, the container 156A occupies more space than the container 156B on the instance 156. Similarly, the containers 157A, 157B, 157C may be equally sized. In some embodiments, the sizes of the containers may be 64 MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance.

Although the components inside the containers 156B, 157A, 157B, 157C are not illustrated in the example of FIG. 1, each of these containers may have various operating systems, language runtimes, libraries, and/or user code. In some embodiments, instances may have user codes loaded thereon (e.g., in an instance-level cache), and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

After a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156A-3 shown in the container 156A), the worker manager 140 may assign the container to the request and cause the user code to be executed in the container. Alternatively, if the user code is available in the local cache of one of the virtual machine instances (e.g., stored on the instance but does not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to service the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to service the request at the time the request is received. In some embodiments, instead of initiating the requested code execution as soon as the code execution request is received, the virtual compute system 110 may schedule the code execution according to the scheduling information provided by the request. For example, the request may specify a temporal window (e.g., between 3:00 AM to 4:00 AM next Monday) within which the virtual compute system 110 is requested to perform the code execution, and the virtual compute system 110 may schedule the code execution based on certain performance considerations (e.g., workload, latency, etc.).

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manager 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. In some embodiments, the virtual compute system 110 may maintain a separate cache in which user codes are stored to serve as an intermediate level of caching system between the local cache of the virtual machine instances and a web-based network storage (e.g., accessible via the network 104).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container is received, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, periodicity information (e.g., containers/instances in the active pool 140A not currently executing user code thereon can be (i) kept alive if the periodicity information indicates that additional requests are expected to arrive soon or (ii) terminated if the periodicity information indicates that additional requests are not likely to arrive soon enough to justify keeping the containers/instances alive), and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

Capacity Acquisition and Maintenance Manager

The capacity manager 150 acquires and maintains compute capacity that may be used for code execution requests received by the virtual compute system 110 (e.g., via the frontend 120). For example, the capacity manager 150 may communicate with the frontend 120, the warming pool manager 130, the worker manager 140, and/or other external services such as the instance provisioning service 109 to acquire and add virtual machine instances to the warming pool 130A (e.g., to one or more sub-pools therein) and/or the active pool 140A. As discussed above, any processes or methods described herein as being performed by the capacity manager 150 may alternatively or collectively performed by another component of the virtual compute system 110 such as the frontend 120, the warming pool manager 130, and/or the worker manager 140.

The capacity manager 150 may include a capacity acquisition unit for acquiring compute capacity from a variety of sources, and a capacity maintenance unit for maintaining the acquired capacity in one or more sub-pools within the warming pool 130A and/or the active pool 140A and causing the instances to be moved among the warming pool 130A, the active pool 140A, and/or any of the sub-pools therein. An example configuration of the capacity manager 150 is described in greater detail below with reference to FIG. 2.

Different User Needs

Existing implementations of virtual compute systems may involve managing a homogenous fleet of virtual machine instances that are pre-configured in a way that the virtual machine instances can be used to service any type of incoming code execution requests. In contrast, in some embodiments of the present disclosure, the virtual compute system 110 may manage a more heterogeneous fleet including numerous sub-pools of virtual machine instances that are configured to service different types of requests and/or satisfy different user needs/goals. For example, one user may want a guarantee that the compute capacity used to handle his or her requests are not shared with anyone (either at the hardware level or software level). Another user may want a guarantee that a specific amount of low-latency compute capacity would be available for servicing requests associated the user at all times. Yet another user may wish to acquire as much compute capacity as possible at the cheapest price point possible. In some embodiments of the present disclosure, these different types of user needs can be satisfied using different types of sub-pools maintained by the capacity manager 150.

Dedicated Compute Capacity

As discussed above, some users of the virtual compute system 110 may be in industries (e.g., healthcare industry) in which compliance with various privacy and security regulations is critical or even mandatory. In some existing implementations, the virtual compute systems may acquire instances, assign the instances to a particular user in order to service his or her code execution requests, and once the code executions are finished, the instances are spun down, reconstructed, and assigned to a different user. The hardware implementing those instances could be in any one of the data centers of the virtual compute system 110 and could be hosting many other instances running other users' codes. However, such a multi-tenanted architecture may pose a higher-than-tolerable security risk for some users (e.g., especially those in highly regulated industries). In order to satisfy the security needs of such users, the capacity manager 150 may acquire and maintain, for each of such users (e.g., in the warming pool 130A or the active pool 140A), a dedicated pool of instances that are implemented on single-tenanted hardware that is not to be shared with any other user. For example, such users may want their program codes to be executed on a piece of hardware (e.g., one or more physical servers) that is literally isolated and dedicated to their uses, and the virtual compute system 110 may provide the guarantee that the hardware and/or physical servers are not used for any user other than the user to whom the instances belong (e.g., "dedicated user"). In some embodiments, the hardware and/or the physical servers may be used to service other users' code execution requests once the dedicated user terminates his or her account on the virtual compute system 110 or changes his or her account type to one that does not provide dedicated compute capacity.

In some embodiments, users can specify the type of instances based on the workload (e.g., compute heavy workload, network heavy workload, memory heavy workload, etc.) so that the dedicated instances acquired and maintained for the user are optimized for the user's workload, thereby achieving lower latency or other performance advantages. The sub-pool of dedicated compute capacity may have a fixed size, unlike other sub-pools within the warming pool 130A. The capacity manager 150 may automatically adjust the size of the sub-pool based on identified trends or based on user policies. For example, the capacity manager 150 may acquire or purchase additional instances from the instance provisioning service 109 on a user's behalf and add the instances to the sub-pool dedicated to the user. In some embodiments, the user may specify a limit on the number of additional instances that the capacity manager 150 may automatically acquire on the user's behalf or specify a range within which the capacity manager 150 has permission to dynamically adjust (e.g., increase or decrease based on utilization, historical trends, etc.) the number of instances dedicated to the user.

In some implementations, the user may provide instructions regarding where to get the instances, what type of instances to get, how many instances to get, etc. and then the capacity manager 150 may purchase/acquire the instances for the user. In other cases, the user may acquire a pool of instances (e.g., from the instance provisioning service 109) and choose to assign some or all of the instances for use by the virtual compute system 110. In such embodiments, the virtual compute system 110 may use the assigned instances to service the requests associated with the user. The number, amount, or percentage of the instances assigned to the virtual compute system 110 may be specified by the user (e.g., via one or more UIs, CLIs, APIs, and/or other programmatic interfaces provided by the virtual compute system 110) or determined by the virtual compute system 110 based on the history of requests received by the virtual compute system 110 (e.g., current utilization %, traffic pattern of requests associated with the user, etc.). For example, the capacity manager 150 may determine that the number of requests associated with the user has dropped below a threshold amount and yield a portion of the compute capacity assigned to the virtual compute system 110 back to the user (e.g., so that the user can use the compute capacity for running code outside of the virtual compute system 110). In some embodiments, the capacity manager 150 may send a notification to the user, alerting him or her that some of the compute capacity previously assigned to the virtual compute system 110 is available for his or her use outside of the virtual compute system 110, for example, due to under-utilization.

More Complete Pre-Warming of Compute Capacity

Typically, in the event that an instance needs to be taken out of the warming pool 130A to service a code execution request of a user (e.g., if the active pool 140A does not have sufficient capacity to service the user's request), the instance is assigned to the user, the program code to be executed on the instance is located and downloaded, a container is created on the instance, the program code is placed in the container, and then the program code is executed with the right set of parameters. In contrast, if the warming pool 130A contains a sub-pool of instances dedicated to the user (e.g., bound to the user's account and used only for the user), the sub-pool of instances can be pre-warmed even further based on the information associated with the user (e.g., operating systems, language runtimes, libraries, program codes, etc.) up to the point immediately before code execution or as close to the point immediately before code execution as possible, even before any code execution request associated with the user is received by the virtual compute system 110.

In some embodiments, the sub-pool of instances may be pre-loaded with all the different combinations of operating systems, language runtimes, libraries, program codes, and/or other software components that are specified by the user. For example, the user may specify that 45% of the instances should be set up for running Function Foo in Python, and 55% of the instances should be set up for running Function Bar in Java. Alternatively or additionally, the sub-pool of instances may be pre-loaded with all the different combinations of such software components based on the history of code execution requests received by the virtual compute system 110 (e.g., software combinations that have been requested in the past by the user). In some embodiments, the pre-loading of such software components is performed up to a threshold amount that is automatically determined by the virtual compute system 110 or specified by the user. For example, if the virtual compute system 110 has received requests associated with a particular user having 20 different types of code, only 10 most frequently-used program codes may be loaded onto the instances pre-warmed for the particular user.

In some embodiments, the capacity manager 150 may cause multiple groups of instances to be configured in a way that reflects the historical patterns exhibited by the requests associated with the user. For example, if the capacity manager 150 determines that 95% of the requests associated with the user have involved executing either Function Foo or Function Bar, both of which are part of virtual private cloud (VPC) #1, the capacity manager 150 may cause most of the instances dedicated to or reserved for the user to be set up for VPC #1 in order to get through the time-consuming VPC setup operations, and leave the remaining instances for servicing requests involving other VPCs of the user. For example, the number of instances set up with a given set of configurations (e.g., VPC #1) may be proportional to the percentage of requests that historically involved the given set of configurations. The process of servicing code execution requests is described in greater detail below with reference to FIG. 3.

Adding Additional Capacity to Dedicated or Reserved Sub-Pools

In some embodiments, the sub-pool of instances are fixed in size or number, and the ability of the virtual compute system 110 to service code execution requests of the user is limited by the fixed size or number. For example, if 100 simultaneous requests completely occupy all the compute capacity that the user has available, receiving 120 simultaneous requests would result in the virtual compute system 110 rejecting 20 of those requests. In other embodiments, the capacity manager 150 dynamically adjusts the size of the sub-pool based on the history of code execution requests received by the virtual compute system 110. For example, if the capacity manager 150 determines that the virtual compute system 110 is consistently receiving code executing requests that exceed the total capacity of the sub-pool by 10%, the capacity manager 150 may acquire and add additional instances that can be used to service the extra 10% to the sub-pool. In some embodiments, the capacity manager 110 may adjust the total capacity of the sub-pool only if the capacity manager 150 has been granted the permission to do so by the user (e.g., the user may specify an adjustment policy using one or more UIs, CLIs, APIs, and/or other programmatic interfaces provided by the virtual compute system 110. The process of acquiring compute capacity is described in greater detail below with reference to FIG. 4.

Rejecting Requests Based on Available Capacity

In some embodiments, in view of the fixed compute capacity in the sub-pool dedicated to a given user, the virtual compute system 110 may apply a more lenient request rejection policy towards any requests associated with the given user. In some existing implementations, the virtual compute system 110 may reject a received code execution request if the virtual compute system 110 cannot immediately service the request (e.g., due to insufficient available capacity in the warming pool 130A and/or the active pool 140A or due to the user associated with the request having reached his or her throttle level or used up his or her allotted compute capacity). In some embodiments of the present disclosure, since the sub-pool dedicated to the given user is limited in size (thus may lack the ability to handle burst traffic), the virtual compute system 110 may hold onto the requests associated with the given user for a period of time (e.g., 1 or 2 seconds, a predetermined period of time, or until compute capacity sufficient to service the requests becomes available) even if the sub-pool dedicated to the given user lacks available capacity needed to service the requests at the time the requests are received by the virtual compute system 110. In some embodiments, the virtual compute system 110 may allow and accept deeper and longer queues of code execution requests in view of the fixed compute capacity in the sub-pool dedicated to the given user. The process of handling requests receive by the virtual compute system 110 is described in greater detail below with reference to FIG. 5.

Reserved Compute Capacity

In some embodiments, the capacity manager 150 ensures that a specific amount of low-latency compute capacity is available for servicing requests associated with a given user at all times. For example, the given user may want a guarantee that at least for the first 500 requests sent to the virtual compute system 110 during any given minute (or for the first 500 concurrent code executions on the virtual compute system 110), the requests would not experience a cold-start latency hit (e.g., latency associated with pulling an instance from the warming pool 130A and setting up the instance so that code execution can begin, including, for example, operating system warm-up, language runtime warm-up, function download, virtual private cloud setup, etc.). In such a case, the capacity manager 150 may reserve a sub-pool of instances having sufficient compute capacity to handle the specified amount of burst traffic. In some embodiments, the capacity manager 150 keeps the sub-pool of instances reserved for the given user "warm" such that the instances can be used to service the requests associated with the given user without experiencing the cold-start latency hit. Although the sub-pool of instances is described as being in the warming pool 130A, in other embodiments, the sub-pool can be in the active pool 140A, or split up across the warming pool 130A and the active pool 140A.

As discussed above, in some embodiments, these sub-pools may have a fixed size, unlike the general warming pool that is infinitely scalable and shared among all users of the virtual compute system 110. In such embodiments, the capacity manager 150 may dynamically adjust the size of the sub-pool based on the history of code execution requests received by the virtual compute system 110. For example, if the capacity manager 150 determines that the virtual compute system 110 is consistently receiving code execution requests that exceed the total capacity of the sub-pool by 10%, the capacity manager 150 may acquire and add additional instances that can be used to service the extra 10% to the sub-pool. In some embodiments, the capacity manager 110 may adjust the total capacity of the sub-pool only if the capacity manager 150 has been granted the permission to do so by the user (e.g., the user may specify an adjustment policy using one or more UN, CLIs, APIs, and/or other programmatic interfaces provided by the virtual compute system 110.

In some embodiments, these sub-pools may be used to service requests of any user (e.g., may be attached to any user account). Therefore, these sub-pools may be implemented on multi-tenanted hardware. Further, these sub-pools may include specific types of instances optimized for satisfying particular user needs. For example, if the user associated with a sub-pool of reserved instances wish to process compute heavy workload, the sub-pool may be configured to include a certain type of instances optimized for compute heavy workloads. Similarly, network-heavy workloads can be handled by a specific type of instances optimized for network-heavy workloads, memory-heavy workloads can be handled by a specific type of instances optimized for memory-heavy workloads, etc. In some embodiments, the specific instance types may be specified by the user. In other embodiments, the specific instance types are automatically determined and set by the capacity manager 150. In such embodiments, the capacity manager 150 may alter the instance types based on the history of incoming code execution requests associated with the user.

Compute Capacity after Completing Execution

In some embodiments, after completing the code execution on the instances placed in the active pool 140A, the instances are returned to their original sub-pools. For example, if an instance in a sub-pool of instances dedicated to a user was used to complete a code execution associated with the user, the instance is added back to the same sub-pool after completing the code execution. In some implementations, the virtual compute system 110 relinquishes the instance and requests another instance from the instance provisioning service 109 (or another service from which the instance was originally acquired). The requested instance may be of the same type and for the same user. Once acquired, the capacity manager 150 places the acquired instance in the same sub-pool. In some cases, the instance may be implemented on the same hardware that was used to implement the previously relinquished instance. In other cases, the instance may be implemented on hardware different from that used to implement the previously relinquished instance. The instance provisioning service 109 may keep track of which instances and/or hardware should be used for which users (e.g., which hardware should be maintained as single-tenanted hardware tied to a particular user, which hardware can be shared with others, etc.).

In some embodiments, after relinquishing the instance that was used to service a request, the virtual compute system 110 may not acquire an additional instance to replace the relinquished instance in the sub-pool. For example, a user may provide the virtual compute system 110 with an instruction to reduce the number of instances dedicated to the user. Based on the instruction, the virtual compute system 110 may reduce the number of instances dedicated to the user by not requesting or adding additional instances after such instances are used and relinquished or de-provisioned. Similarly, based on an instruction to increase the number of instances dedicated to the user, the virtual compute system 110 may acquire more than one instances to be added to the sub-pool after de-provisioning an instance after use. The number of additional instances acquired may be based on the user instruction.

In some embodiments, the virtual compute system 110 may not always de-provision an instance after each use (e.g., after performing a code execution on the instance). For example, the virtual compute system 110, upon determining that the instance is dedicated to a user and will continue to be used for handling the user's request, may choose to de-provision or apply security updates or make any other changes to the instance less frequently (e.g., half as frequently as other instances, every other time user code is executed on the instance, etc.). The periodicity at which the instances are de-provisioned and re-provisioned, updated, recycled, etc. may be based on the sub-pools from which the instances were taken. For example, if the instance is from a sub-pool of instances dedicated to a user and implemented on single-tenanted hardware, the virtual compute system 110 may de-provision and re-provision the instance less frequently than another instance that is from the general warming pool.

Variable Compute Capacity

In some embodiments, the capacity manager 150 may acquire compute capacity from multiple sources that may each have different resource constraints. For example, the capacity manager 150 may acquire instances from the instance provisioning service 109 at a fixed cost per instance per unit of time. In such an example, the virtual compute system 110 may use (and expect to have access to) the instances for however long the instances were paid for. In some embodiments, alternatively or additionally, the capacity manager 150 may acquire instances from another service at a variable cost per instance per unit of time. For example, in such a service (or market), the cost may vary based on supply and demand. In such embodiments, the capacity manager 150 may specify a maximum amount of resources that it is willing to expend on the instances, and the virtual compute system 110 may use the instances for as long as the variable cost does not eventually exceed (due to market forces) the specified maximum amount. For example, if the capacity manager 150 specifies a maximum amount of $1 per instance per hour for acquiring 20 instances from a service (e.g., instance provisioning service 109 or another service/market), the virtual compute system 110 may use the 20 instances to service incoming code execution requests received by the virtual compute system 110 as long as the cost per instance per hour remains under $1 in the service/market. In some embodiments, acquiring compute capacity from such a service/market may involve some wait time. For example, if a user requests that he or she would like to run some code at a given unit price. If the specified unit price is lower than the current price on the service/market (or market price), the capacity manager 150 cannot immediately acquire the requested compute capacity and may need to wait until the current price reaches or drops below the price specified by the user before the requested compute capacity can be acquired.

In the example above, once the cost per instance per hour exceeds $1 (e.g., due to an increased demand for instances provided by the instance provisioning service/market), the 20 instances may be returned to the instance provisioning service/market. In some embodiments, before the 20 instances are returned to the instance provisioning service/market, the virtual compute system 110 may receive a warning message from the instance provisioning service/market, alerting the virtual compute system 110 that the 20 instances are about to be returned to the instance provisioning service/market. In some embodiments, the virtual compute system 110 may be given the option of increasing the specified maximum amount of resources so that the virtual compute system 110 can continue to keep the 20 instances beyond the previously-specified maximum amount of resources (e.g. $1 per instance per hour). Alternatively or additionally, the virtual compute system 110 may be given the option of purchasing additional instances such that even if some or all of the initial set of 20 instances were returned to the instance provisioning service/market, the virtual compute system 110 can continue to process code execution requests on the newly purchased instances without any interruption. By acquiring some or all of the instances to be placed in the warming pool 130A and/or the active pool 140A from such a service/market that may offer compute capacity at a fraction of the cost typically associated with on-demand compute capacity, the capacity manager 150 can reduce the overall cost associated with maintaining the warming pool 130A and/or the active pool 140A.

In some embodiments, the capacity manager 150 may be able to purchase compute capacity on such a service/market for a fixed duration. In other words, the capacity manager 150 need not worry about losing that capacity for at least the fixed duration. For example, if a code execution request specifies that a program code can be executed at any time within a 5-hour window, the capacity manager 150 can determine the cost of the required amount of compute capacity at any given moment during the 5-hour window, and purchase the required amount of compute capacity when the cost is at its lowest. If the capacity manager 150 determines that completing the code execution associated with the received request requires holding onto a unit of compute capacity for an hour and that compute capacity offered by an instance provisioning service is cheapest at the third hour within the 5 hour window, the capacity manager 150 can purchase the compute capacity at that third hour, minimizing the cost to the virtual compute system 110 and/or the user.

In some embodiments, the user may specify that the user wishes to run some program code only if the cost associated with running the program code is below a threshold amount. For example, the threshold amount may be an absolute dollar amount, a percentage of the cost associated with on-demand compute capacity, or a number based on market trends (e.g., within 20% of the market minimum in the past 2-months, 75% of the market maximum in the past 3 weeks, etc.). Alternatively or additionally, the user may specify a spending cap on the dollar amount that the capacity manager 150 can use to acquire compute capacity for the user. For example, the user may specify that he or she wishes to execute some program code on the virtual compute system 110, but does not wish to spend more than $500 per month.

As another example, the user may specify that he or she wishes to execute some program code on the virtual compute system 110 without spending more than $300 total.

For example, the user may wish to process some workload that is latency-insensitive (does not matter how long it takes) and time-insensitive (does not matter when it gets done) but computationally intensive, such as data archiving. In such an example, the capacity manager 150 can determine how to service his or her code execution requests within the specified budget, using the various types of compute capacity available to the virtual compute system 110. In some cases, the capacity manager 150 may determine that, while the specified budget is not enough to acquire on-demand compute capacity, the virtual compute system 110 can complete the code executions during off-peak hours for the specified budget. In such cases, the capacity manager 150 may wait until a sufficient amount of affordable compute capacity becomes available and then complete the requests. If the capacity manager 150 determines that a sufficient amount of compute capacity cannot be acquired for the specified budget, the capacity manager 150 may send a notification to the user indicating that the specified budget is too low. In some embodiments, if the specified budget falls short by an amount that is within a threshold value (e.g., only a 5% budget increase is needed to acquire sufficient compute capacity), the capacity manager 150 may acquire the needed compute capacity (either from the instance provisioning service 109 or from the warming pool 130A) without notifying the user and/or without charging the overage to the user.

The user may specify a user policy that indicates how the capacity manager 150 is to proceed under different circumstances. For example, the user policy may specify that the user does not wish to complete any of the code execution requests if the capacity manager 150 cannot acquire the needed compute capacity for the specified budget. In another case, the user policy may specify that the capacity manager 150 should acquire as much compute capacity as possible from the market (or an instance provisioning service providing variable pricing based on supply and demand) below a specified price point, before acquiring any additional on-demand compute capacity needed to complete the code execution requests (or before drawing from the warming pool 130A).

Combination of Different Sub-Pools of Compute Capacity

In some embodiments, users may wish to utilize one type of compute capacity for a portion of his or her workload and another type of compute capacity for another portion of his or her workload. For example, a user may specify that code execution requests associated with Function Foo should be handled by the sub-pool of instances dedicated to (and only to) the user, but code execution requests associated with Function Bar should be handled by more affordable compute capacity acquired from the market. As another example, the user may specify that code execution requests sent during peak hours should be handled by the sub-pool of instances reserved for his or her use, but code execution requests sent during off-peak hours should be completed only if the needed compute capacity can be acquired for under a threshold dollar value. In other embodiments, a user may specify how much of the compute capacity dedicated to the user should be used for handling one or more functions associated with the user. For example, the user may specify that 30% of the instances dedicated to the user should be used for handling requests associated with Function Foo, 60% of the instances dedicated to the user should be used for handling requests associated with Function Bar, and the remaining compute capacity dedicated to the user should be used for handling other requests.

In some embodiments, the capacity manager 150 may segregate code execution requests based on user needs. For example, some users may be willing to wait virtually forever for their requests to complete as long as the price is right, and others may need their requested code executions initiated in the next milliseconds even if that means paying more. In such an example, the capacity manager 150 may service code execution requests of the former (e.g., the users who are willing to wait) using the compute capacity associated with lower resource constraints than other on-demand capacity but may be prone to interruptions or outright losses, and service code execution requests of the latter (e.g., the users who need their requests handled immediately) using on-demand, dedicated, or reserved compute capacity.

General Architecture of Capacity Manager

Figure 2:
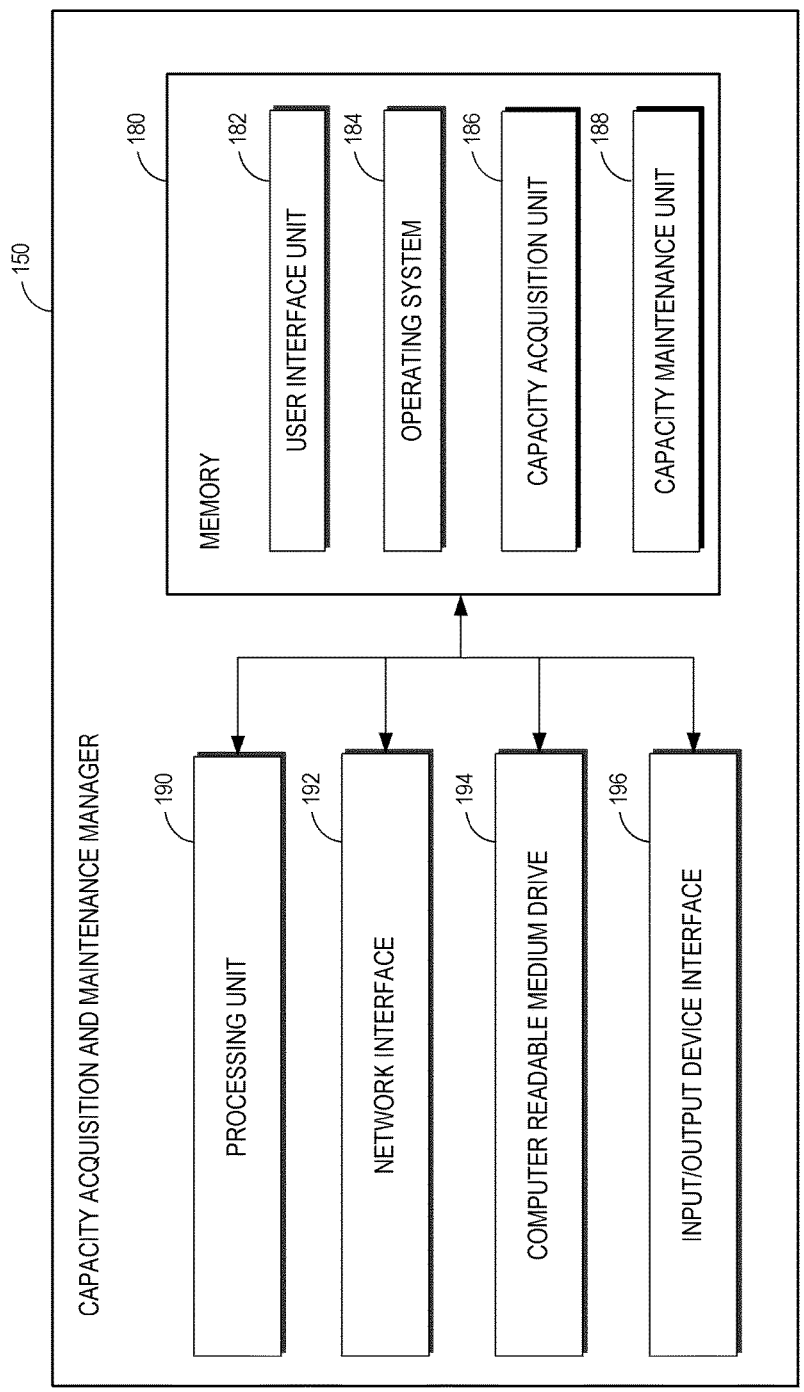
FIG. 2 depicts a general architecture of a computing device providing a capacity acquisition and maintenance manager for acquiring and maintaining different types of compute capacity, according to an example aspect.

FIG. 2 depicts a general architecture of a computing system (referenced as capacity manager 150) that manages the virtual machine instances in the virtual compute system 110. The general architecture of the capacity manager 150 depicted in FIG. 2 includes an arrangement of computer hardware and software modules that may be used to implement aspects of the present disclosure. The capacity manager 150 may include many more (or fewer) elements than those shown in FIG. 2. It is not necessary, however, that all of these generally conventional elements be shown in order to provide an enabling disclosure. As illustrated, the capacity manager 150 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the capacity manager 150. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a capacity acquisition unit 186 and a capacity maintenance unit 188 that may be executed by the processing unit 190. In one embodiment, the user interface unit 182, capacity acquisition unit 186, and capacity maintenance unit 188 individually or collectively implement various aspects of the present disclosure, e.g., acquiring and maintaining different types of compute capacity, using the compute capacity to service incoming code execution requests, adjusting compute capacity based on user policies, etc. as described further below.

The capacity acquisition unit 186 acquires compute capacity from a variety of sources. For example, the capacity acquisition unit 186 may request additional compute capacity from the instance provisioning service 109 based on the available compute capacity in the warming pool 130A and/or the active pool 140A. Further, the capacity acquisition unit 186 may acquire compute capacity from different sub-pools as needed. For example, upon determining that a pool of instances reserved for a given user is almost empty, the capacity acquisition unit 186 may acquire additional instances from the general warming pool that is shared across all users of the virtual compute system 110.

The capacity maintenance unit 188 maintains the acquired capacity in one or more sub-pools within the warming pool 130A and/or the active pool 140A. For example, the capacity maintenance unit 188 may maintain one or more sub-pools dedicated to individual users or a group of users that are used only for servicing requests associated with such users. In another example, the capacity maintenance unit 188 may maintain one or more sub-pools that include compute capacity associated with lower resource constraints than other on-demand capacity but may be prone to interruptions or outright losses.

While the capacity acquisition unit 186 and the capacity maintenance unit 188 are shown in FIG. 2 as part of the capacity manager 150, in other embodiments, all or a portion of the capacity acquisition unit 186 and the capacity maintenance unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the capacity manager 150.

Example Routine for Executing Code on Virtual Compute System

Figure 3:
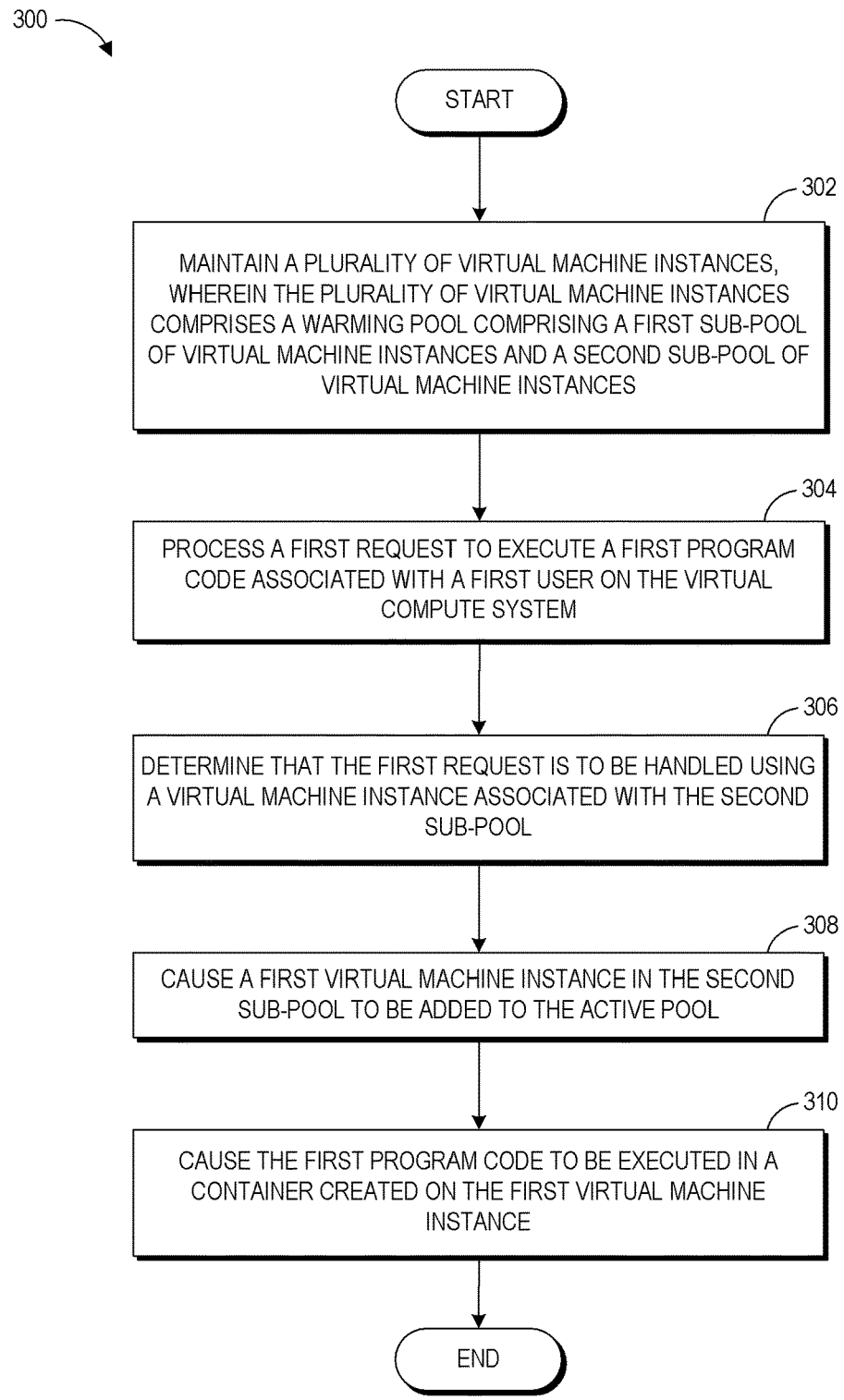
FIG. 3 is a flow diagram illustrating a code execution routine for executing a program code on a virtual machine instance from a dedicated pool associated with a user, according to an example aspect.

Turning now to FIG. 3, a routine 300 implemented by one or more components of the virtual compute system 110 (e.g., the capacity manager 150) will be described. Although routine 300 is described with regard to implementation by the capacity manager 150, one skilled in the relevant art will appreciate that alternative components may implement routine 300 or that one or more of the blocks may be implemented by a different component (e.g., the frontend 120, the warming pool manager 130, or the worker manager 140) or in a distributed manner.

At block 302 of the illustrative routine 300, the capacity manager 150 maintains a plurality of virtual machine instances. The plurality of virtual machine instances comprises a warming pool comprising a first sub-pool of virtual machine instances and a second sub-pool of virtual machine instances. For example, the first sub-pool may include general compute capacity (e.g., virtual machine instances) that can be shared among all the users of the virtual compute system 110, and the second sub-pool may include compute capacity that is dedicated to a particular user of the virtual compute system 110. In such an example, the second sub-pool may be implemented on separate hardware that cannot be used by or rented out to any user other than the particular user.

Next, at block 304, the capacity manager 150 processes a first request to execute a first program code associated a first user on the virtual compute system 110. For example, the received first request may indicate the identity of the user associated with the first request. At block 306, the capacity manager 150 determines that the first request is to be handled using a virtual machine instance associated with the second sub-pool. For example, the request may be associated with a user who has a dedicated pool (e.g., second sub-pool) of instances on the virtual compute system 110 that is different from the general warming pool that can be used to service requests associated with any user of the virtual compute system.

At block 308, the capacity manager 150 causes a first virtual machine instance in the second sub-pool to be added to the active pool 140A. For example, the first virtual machine instance may already be configured appropriately for being used to service the first request even before the first request is received by the virtual compute system 110. At block 310, the capacity manager 150 causes the first program code to be executed in a container created on the first virtual machine instance. In some embodiments, the container may already be created on the first virtual machine instance even before the first request is received by the virtual compute system 110.

While the routine 300 of FIG. 3 has been described above with reference to blocks 302-310, the embodiments described herein are not limited as such, and one or more blocks may be omitted, modified, or switched without departing from the spirit of the present disclosure. For example, although the capacity manager 150 determines that the incoming request is to be handled using a virtual machine instance associated with the second sub-pool in the example of FIG. 3, in other embodiments, the capacity manager 150 may determine that the incoming request is to be handled using a virtual machine instance associated with any one of the multiple sub-pools in the warming pool 130A or the active pool 140A.

Example Routine for Acquiring Additional Capacity

Figure 4:
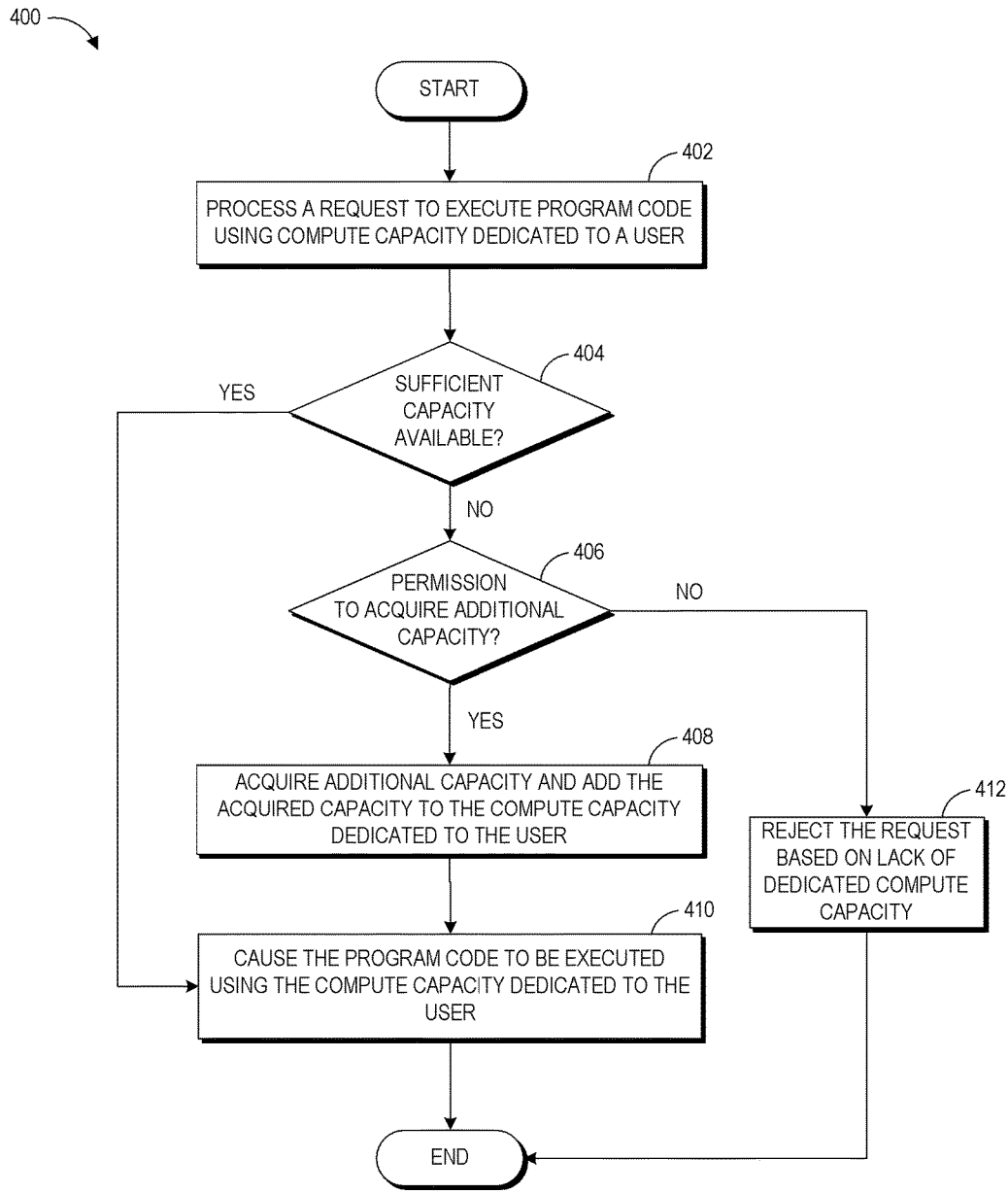
FIG. 4 is a flow diagram illustrating a capacity acquisition routine for acquiring additional compute capacity to be added to the compute capacity dedicated to or reserved for a user, according to an example aspect.

Turning now to FIG. 4, a routine 400 implemented by one or more components of the virtual compute system 110 (e.g., the capacity manager 150) will be described. Although routine 400 is described with regard to implementation by the capacity manager 150, one skilled in the relevant art will appreciate that alternative components may implement routine 400 or that one or more of the blocks may be implemented by a different component (e.g., the frontend 120, the warming pool manager 130, or the worker manager 140) or in a distributed manner.

At block 402 of the illustrative routine 400, the capacity manager 150 processes a request to execute program code using compute capacity dedicated to or reserved for a user. At block 404, the capacity manager 150 determines whether the virtual compute system 110 has compute capacity sufficient to handle the request. If the capacity manager 150 determines that the virtual compute system 110 has compute capacity sufficient to handle the request, the routine 400 proceeds to block 410. Otherwise, the routine 400 proceeds to block 406.

At block 406, the capacity manager 150 determines whether the virtual compute system 110 has the user's permission to acquire additional compute capacity. If the capacity manager determines that the virtual compute system 110 has the user's permission to acquire additional compute capacity, the routine 400 proceeds to block 408. Otherwise, the routine 400 proceeds to block 412.

At block 408, the capacity manager 150 acquires additional compute capacity and adds the acquired compute capacity to the compute capacity dedicated to or reserved for the user. For example, the capacity manager 150 may acquire the compute capacity from the instance provisioning service 109 or the warming pool 130A. In some embodiments, the capacity manager 150 acquires the additional compute capacity from the source from which the exhausted compute capacity was originally acquired. For example, if the determination at block 404 was based on the exhaustion of instances dedicated to the requesting user, the capacity manager 150 may acquire additional instances from the source (e.g., the instance provisioning service 109) from which the dedicated instances were first acquired. At block 410, the capacity manager 150 causes the program code to be executed using the compute capacity dedicated to or reserved for the user. At block 412, the capacity manager 150 rejects the request based on the lack of dedicated or reserved compute capacity sufficient to handle the request.

While the routine 400 of FIG. 4 has been described above with reference to blocks 402-412, the embodiments described herein are not limited as such, and one or more blocks may be omitted, modified, or switched without departing from the spirit of the present disclosure.

Example Routine for Handling Code Execution Requests

Figure 5:
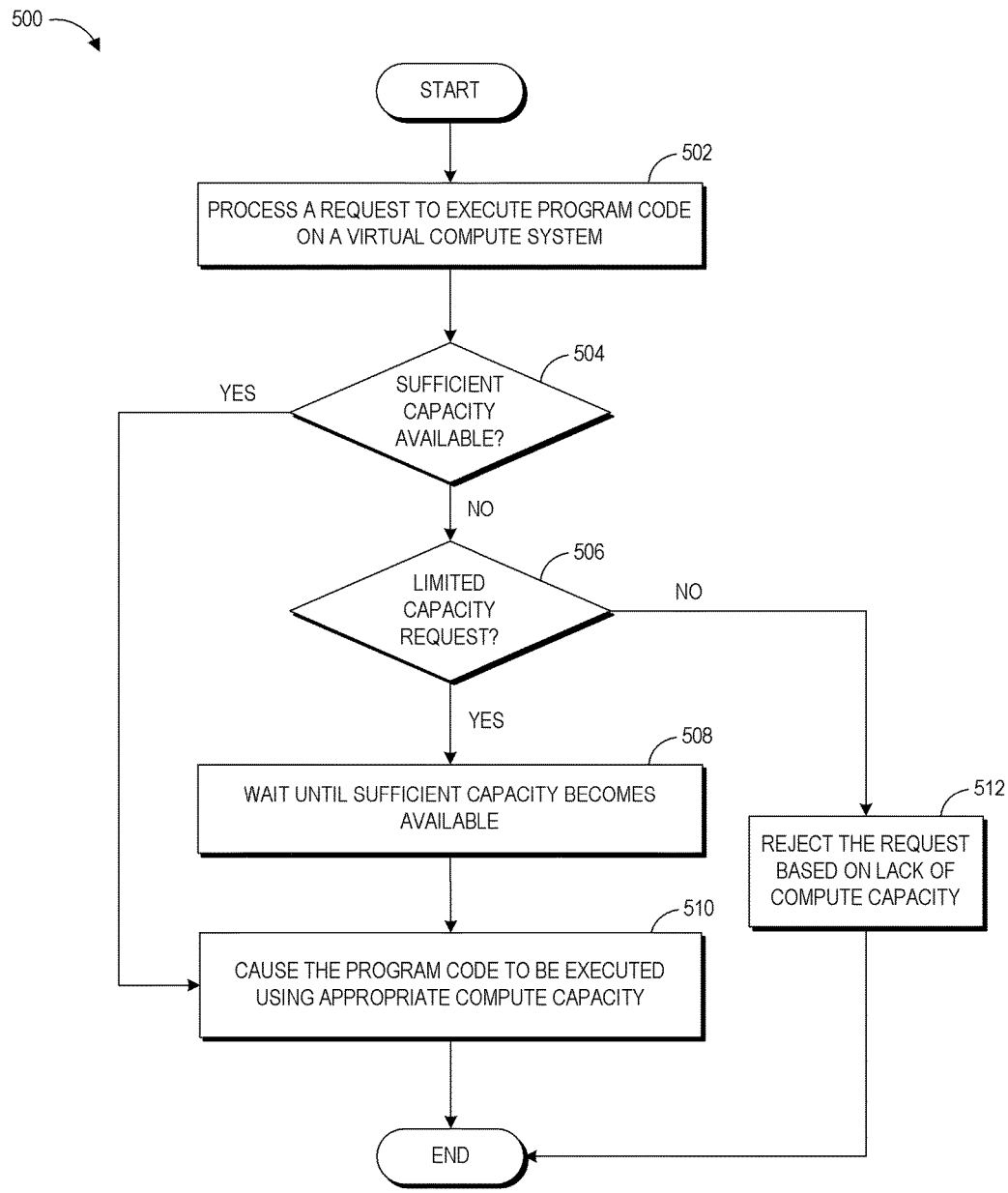
FIG. 5 is a flow diagram illustrating a request handling routine for processing a limited capacity request, according to an example aspect.

Turning now to FIG. 5, a routine 500 implemented by one or more components of the virtual compute system 110 (e.g., the capacity manager 150) will be described. Although routine 500 is described with regard to implementation by the capacity manager 150, one skilled in the relevant art will appreciate that alternative components may implement routine 500 or that one or more of the blocks may be implemented by a different component (e.g., the frontend 120, the warming pool manager 130, or the worker manager 140) or in a distributed manner.

At block 502 of the illustrative routine 500, the capacity manager 150 processes a request to execute program code on the virtual compute system 110. At block 504, the capacity manager 150 determines whether the virtual compute system 110 has compute capacity sufficient to handle the request. If the capacity manager 150 determines that the virtual compute system 110 has compute capacity sufficient to handle the request, the routine 500 proceeds to block 510. Otherwise, the routine 500 proceeds to block 506.

At block 506, the capacity manager 150 determines whether the request is a limited capacity request. For example, a limited capacity request may be a request associated with a sub-pool of compute capacity that has a limited size. Such a sub-pool may be dedicated to handling requests associated with a particular user and not any other user of the virtual compute system 110. Since such a sub-pool has a limited size, the sub-pool may reach maximum capacity more frequently than the general warming pool shared across all user accounts. Thus, it may be beneficial to not immediately reject the request even if there is insufficient compute capacity in the sub-pool at the time the request is received. Instead, the capacity manager 150 may wait until sufficient compute capacity becomes available in the sub-pool, especially if additional compute capacity is expected to free up shortly. Additionally or alternatively, a limited capacity request may be a request associated with a sub-pool of compute capacity that does not have guaranteed availability. In some embodiments, the request associated with a user may indicate that the user wishes to utilize compute capacity that may have reduced availability (e.g., not on-demand) but also a lower cost. For example, these instances may cost 50% less than other on-demand instances but may also be available only 90% of the time. The availability and cost of such instances may be directly correlated or directly proportional. For example, if a user wishes to acquire and utilize compute capacity at $5.00 per hour, the user may be able to do so 90% of the time, but if the user wishes to acquire and utilize compute capacity at $4.00, the user may be able to do so 72% of the time, and so on. The availability of such instances may reach 100% if the price exceeds a first threshold value, and conversely, the availability of such instances may reach 0% if the price falls below a second threshold value. At block 506, if the capacity manager 150 determines that the request is a limited capacity request, the routine 500 proceeds to block 508. Otherwise, the routine 500 proceeds to block 512.

At block 508, the capacity manager 150 waits until sufficient compute capacity becomes available in the sub-pool. For example, the capacity manager 150 may wait until one of the instances dedicated to the requesting user to free up. In another example, the capacity manager 150 may wait until the capacity manager 150 can acquire an instance from the instance provisioning service 109 or another service/market under terms that satisfy one or more criteria (e.g., user-specified maximum price at which the user is willing to purchase the instances or minimum quantity the user is willing to purchase).

At block 510, the capacity manager 150 causes the program code to be executed using the available compute capacity. In some embodiments, the capacity manager 150 may wait for a threshold period of time, and if there still is not enough compute capacity to service the request, the routine 500 may proceed to block 512 even if the request has been determined to be a limited capacity request. At block 512, the capacity manager 150 rejects the request based on the lack of compute capacity sufficient to handle the request.

While the routine 500 of FIG. 5 has been described above with reference to blocks 502-512, the embodiments described herein are not limited as such, and one or more blocks may be omitted, modified, or switched without departing from the spirit of the present disclosure. For example, although the capacity manager 150 determines whether the incoming request is a limited capacity request at block 506, in other embodiments, the capacity manager 150 may instead determine the nature or type of the request (e.g., latency-sensitive requests such as those related to real-time trading systems vs, relatively latency-insensitive requests such as those related to data archiving), user preferences (e.g., user-specified maximum wait time for each user function executed on the virtual compute system 110), or any other metric that can be used to gauge how long the requestor may be willing to wait for the requested code execution to be completed.

Example Routine for Handling Code Execution Requests

Figure 6:
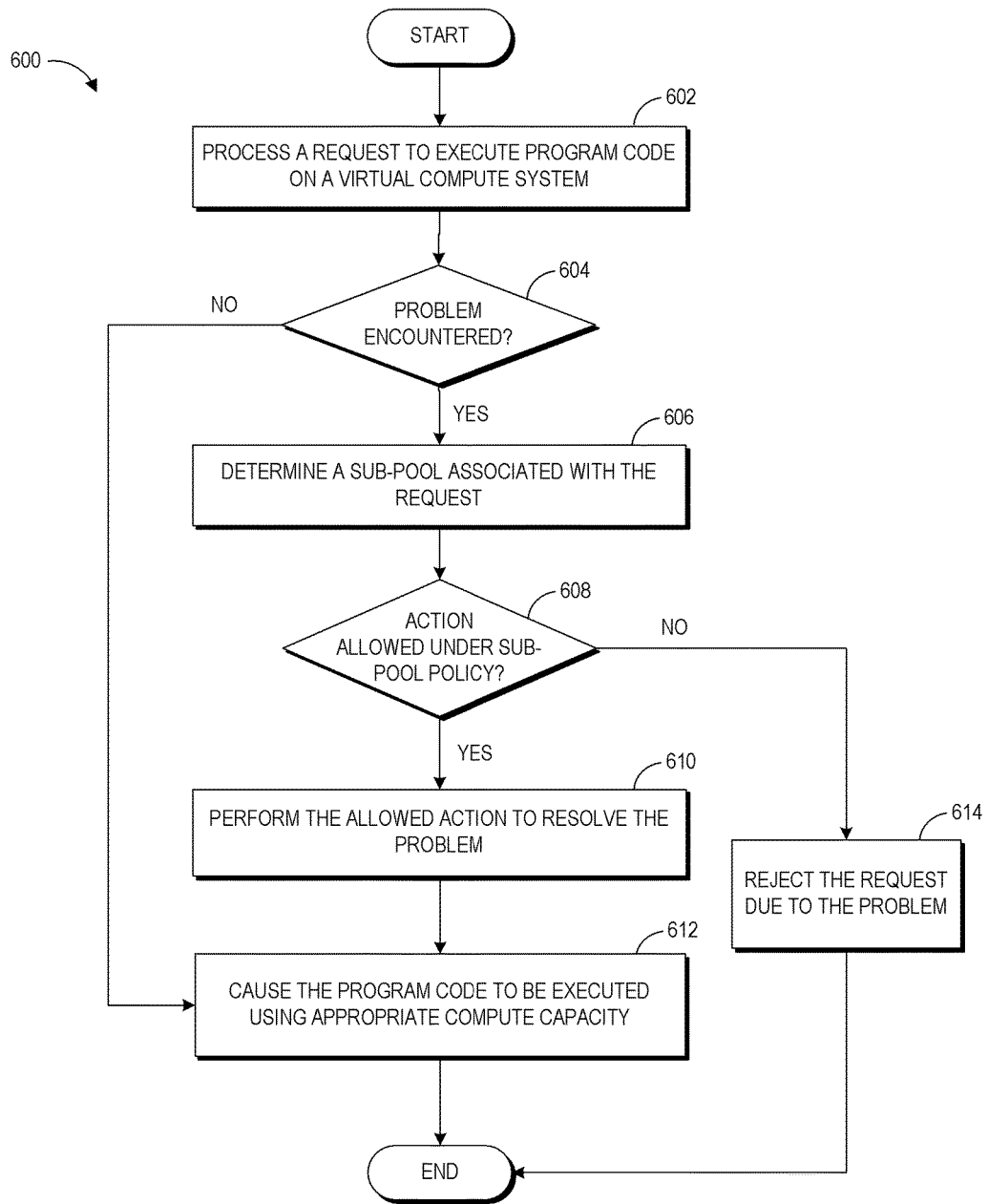
FIG. 6 is a flow diagram illustrating a request handling routine for processing a request containing a problem, according to an example aspect.

Turning now to FIG. 6, a routine 600 implemented by one or more components of the virtual compute system 110 (e.g., the capacity manager 150) will be described. Although routine 600 is described with regard to implementation by the capacity manager 150, one skilled in the relevant art will appreciate that alternative components may implement routine 600 or that one or more of the blocks may be implemented by a different component (e.g., the frontend 120, the warming pool manager 130, or the worker manager 140) or in a distributed manner.

At block 602 of the illustrative routine 600, the capacity manager 150 processes a request to execute program code on the virtual compute system 110. At block 604, the capacity manager 150 determines whether there is a problem with the request. For example, the capacity manager 150 may determine that the virtual compute system 110 lacks compute capacity sufficient to handle the request. If the capacity manager 150 determines that there is no problem with the request, the routine 600 proceeds to block 612. Otherwise, the routine 600 proceeds to block 606.

At block 606, the capacity manager 150 determines a sub-pool associated with the request. For example, the request may indicate (either explicitly, or implicitly based on the user account associated with the request) that the request is to be handled using compute capacity in a sub-pool of instances dedicated to the user associated with the request. In another example, the request may indicate that the request is to be handled using compute capacity that may have limited or reduced availability but offered at a lower cost. In yet another example, the request may indicate that the request is to be handled using compute capacity in the general warming pool, which may be readily available and automatically scalable.

At block 608, the capacity manager 150 determines whether an action (e.g., a remedial action such as acquiring additional compute capacity, allowing the request to remain in a request queue for a threshold time period instead of immediately rejecting the request, etc.) is allowed under the policy associated with the determined sub-pool. For example, acquiring additional compute capacity to service a request may not be allowed for some sub-pools (e.g., a sub-pool associated with a user who has specified a maximum compute capacity for the sub-pool) but is for others (e.g., the general warming pool). In another example, allowing the request to remain in a request queue until additional compute capacity frees up or is acquired may be allowed for some sub-pools (e.g., a sub-pool of instances dedicated to the user associated with the request) but not for others (e.g., the general warming pool). If the capacity manager 150 determines that the action is not allowed, the routine 600 proceeds to block 614. Otherwise, the routine 600 proceeds to block 610.

At block 610, the capacity manager 150 performs the allowed action to resolve the problem. For example, the capacity manager 150 may acquire additional compute capacity or wait until additional compute capacity frees up. At block 612, the capacity manager 150 causes the program code associated with the request to be executed using appropriate compute capacity. At block 614, the capacity manager 150 rejects the request due to the problem that could not be resolved under the sub-pool policy.

While the routine 600 of FIG. 6 has been described above with reference to blocks 602-614, the embodiments described herein are not limited as such, and one or more blocks may be omitted, modified, or switched without departing from the spirit of the present disclosure.

Example Routine for Acquiring Compute Capacity

Figure 7:
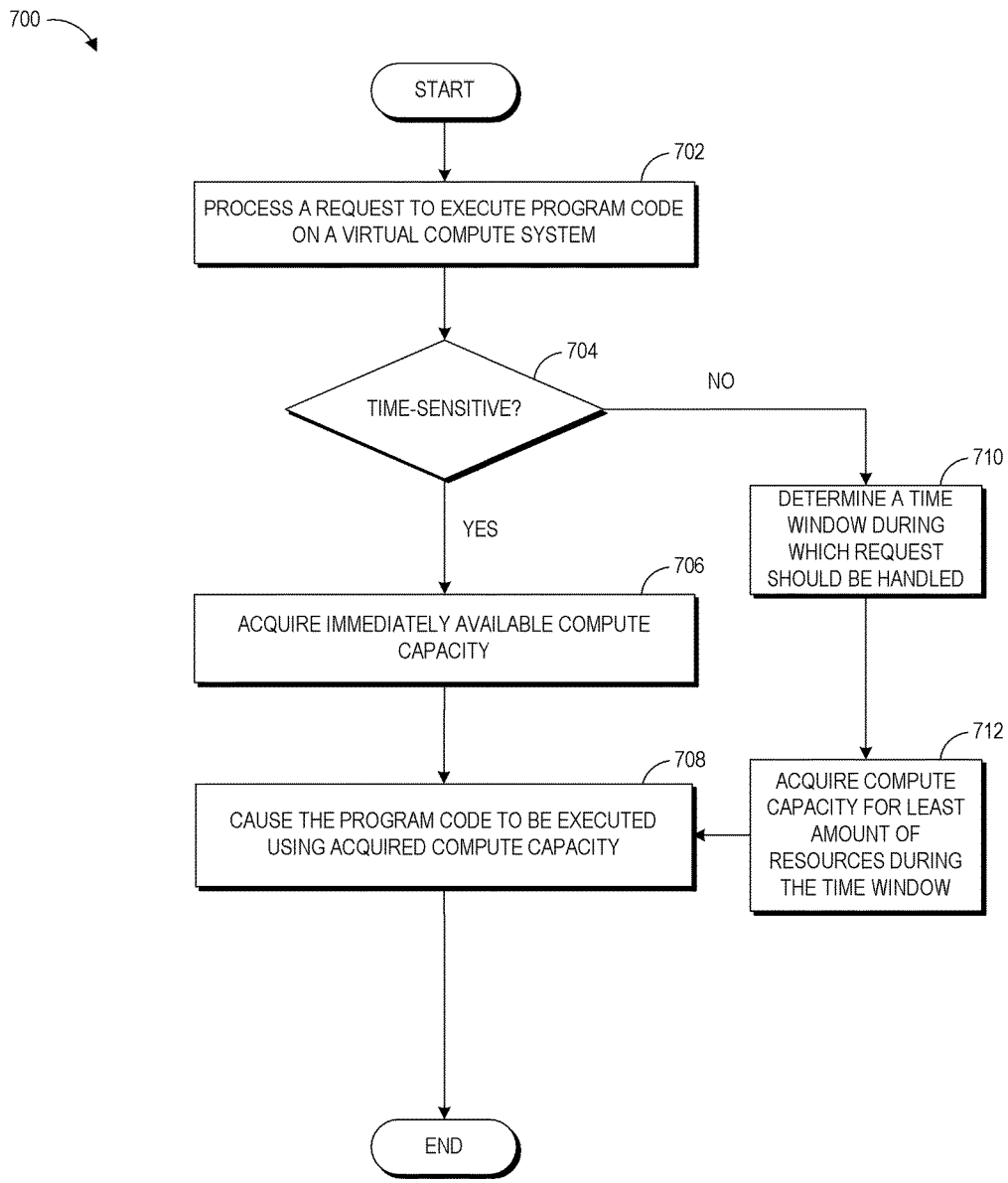
FIG. 7 is a flow diagram illustrating a capacity acquisition routine for acquiring compute capacity for a time-sensitive or latency-sensitive request, according to an example aspect.

Turning now to FIG. 7, a routine 700 implemented by one or more components of the virtual compute system 110 (e.g., the capacity manager 150) will be described. Although routine 700 is described with regard to implementation by the capacity manager 150, one skilled in the relevant art will appreciate that alternative components may implement routine 700 or that one or more of the blocks may be implemented by a different component (e.g., the frontend 120, the warming pool manager 130, or the worker manager 140) or in a distributed manner.

At block 702 of the illustrative routine 700, the capacity manager 150 processes a request to execute program code on the virtual compute system 110. At block 704, the capacity manager 150 determines whether the request is a time-sensitive request or a latency-sensitive. For example, the request may be a latency-sensitive request associated with a real-time trading system. In another example, the request may be a relatively latency-insensitive request associated with a data archiving system. In some embodiments, the capacity manager 150 may determine whether the request is a time-sensitive request based on the information included in the request (e.g., a flag for indicating that the request is a time-sensitive request). In other embodiments, the capacity manager 150 may determine whether the request is a time-sensitive request based on the user associated with the request and/or the user code associated with the request. For example, the user may have previously provided to the virtual compute system 110 an indication of which user codes are time-sensitive and which user codes are not. In another example, the user may have previously provided to the virtual compute system 110 an indication that all user codes associated with the user are time-sensitive (or not time-sensitive). If the capacity manager 150 determines that the request is not a time-sensitive request, the routine 700 proceeds to block 710. Otherwise, the routine 700 proceeds to block 706.

At block 706, the capacity manager 150 acquires immediately available compute capacity, for example, from the warming pool 130A, the active pool 140A, or the instance provisioning service 109. At block 708, the capacity manager 150 causes the program code associated with the request to be executed using the acquired compute capacity.

At block 710, the capacity manager 150 determines a time window during which the request should be handled. For example, the request may provide a time window during which the request should be completed. In some cases, the request may specify a deadline by which the request should be completed (e.g., within 5 hours). In another example, the request may specify a time window (e.g., next Sunday, between 1 pm-5 pm).

At block 712, the capacity manager 150 acquires compute capacity that costs the least amount of resources during the determined time window. For example, if the capacity manager 150 determines that, for the next 5 hours, acquiring compute capacity from the instance provisioning service 109 for the third hour during the 5 hours costs the least amount of resources (e.g., dollar amount, computing resources, etc.), the capacity manager 150 may acquire compute capacity for the third hour in the 5-hour window. At block 708, as discussed above, the capacity manager 150 causes the program code associated with the request to be executed using the acquired compute capacity.

While the routine 700 of FIG. 7 has been described above with reference to blocks 702-712, the embodiments described herein are not limited as such, and one or more blocks may be omitted, modified, or switched without departing from the spirit of the present disclosure.

Example Routine for Executing Code on Virtual Compute System

Figure 8:
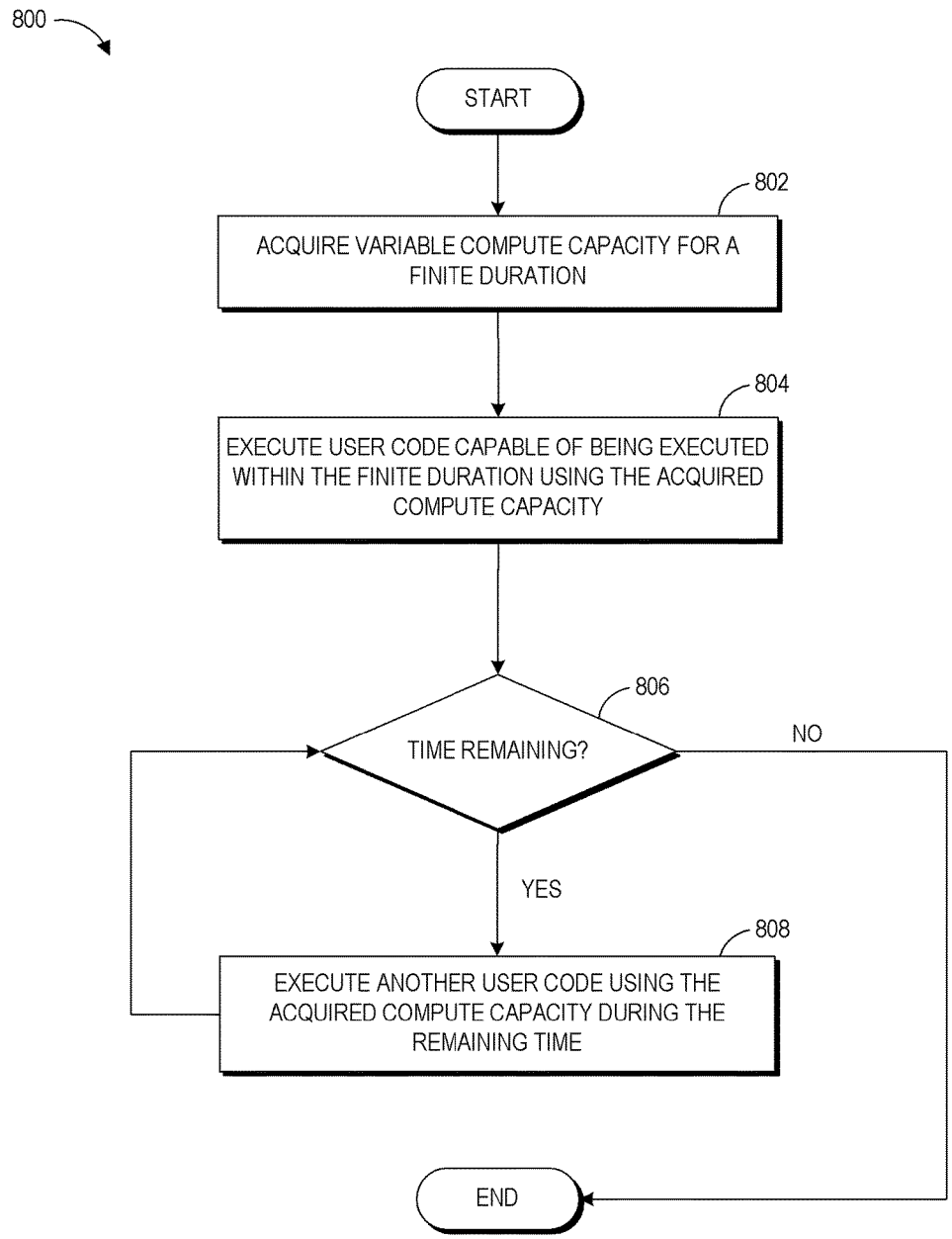
FIG. 8 is a flow diagram illustrating a code execution routine for executing program codes using variable compute capacity, according to an example aspect.

Turning now to FIG. 8, a routine 800 implemented by one or more components of the virtual compute system 110 (e.g., the capacity manager 150) will be described. Although routine 800 is described with regard to implementation by the capacity manager 150, one skilled in the relevant art will appreciate that alternative components may implement routine 800 or that one or more of the blocks may be implemented by a different component (e.g., the frontend 120, the warming pool manager 130, or the worker manager 140) or in a distributed manner.

At block 802 of the illustrative routine 800, the capacity manager 150 acquires variable compute capacity for a finite duration. In some embodiments, the variable compute capacity may have reduced or limited availability (e.g., cannot be immediately acquired and may be taken away from the user shortly after a notice is provided to the user). For example, if a unit of compute capacity is acquired at $3 per hour, after the per-unit market price rises to $4 due to market forces, if the per-unit cost of $4 is greater than the maximum amount that the user is willing to spend on the compute capacity, the acquired compute capacity may be taken away from the user for purchase and use by other users. Even though the variable compute capacity may have reduced or limited availability, once purchased, the variable compute capacity may be guaranteed not to be taken away from the user for a fixed duration. For example, the compute capacity may be purchased in 1-min, 5-min, 15-min, 30-min, 1-hour blocks, or blocks of any other duration. In some embodiments, the capacity manager 150 acquires multiple blocks of compute capacity (e.g., three 1-hour blocks, so that the virtual compute system 110 has guaranteed access to the acquired compute capacity for those 3 hours.).

At block 804, the capacity manager 150 executes user code that is capable of being executed within the finite duration for which the virtual compute system 110 is guaranteed to have access to the acquired compute capacity, using the acquired compute capacity. For example, if the capacity manager 150 has acquired variable compute capacity with 1-hour of guaranteed availability, the capacity manager 105 may cause a program code that is guaranteed to take less than 1 hour (e.g., associated with a maximum duration, after which the code execution request is configured to time out, that is less than 1 hour) to execute to be executed using the acquired variable compute capacity.

At block 806, the capacity manager 150 determines whether there is any time left over in the finite duration after executing the program code. For example, if the variable compute capacity is guaranteed to be available for 1 hour and the code execution took 20 minutes, the virtual compute system 110 still has 40 minutes of guaranteed availability remaining. If the capacity manager 150 determines that there is enough time left over in the finite duration after executing the program code to execution another program code, the routine 800 proceeds to block 808, where the capacity manager 150 executes another program code using the acquired variable compute capacity that can be run during the remaining time, and the routine 800 proceeds back to block 806. Otherwise, the routine 800 ends.

While the routine 800 of FIG. 8 has been described above with reference to blocks 802-808, the embodiments described herein are not limited as such, and one or more blocks may be omitted, modified, or switched without departing from the spirit of the present disclosure.

Other Considerations

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing low-latency computational capacity, the system comprising:
   a virtual compute system comprising one or more hardware computing devices executing specific computer-executable instructions and configured to at least:
   maintain a plurality of virtual machine instances on one or more physical computing devices, wherein the plurality of virtual machine instances comprises:
   a first sub-pool of virtual machine instances waiting to be assigned to one of a plurality of user accounts of the virtual compute system;
   a second sub-pool of virtual machine instances assigned, before a request associated with a first user account of the plurality of user accounts is received by the virtual compute system, to the first user account and having one or more software components specific to the first user account loaded thereon; and
   an active pool comprising virtual machine instances executing one or more program codes thereon;
   receive the request to execute a first program code using compute capacity provided by one of the plurality of virtual machine instances, the request including an identity associated with the first user account and one or more parameters for executing the first program code;
   determine, based on the identity included in the request to execute the first program code, that the first program code is to be executed using compute capacity provided by one of the virtual machine instances in the second sub-pool;
   determine that the second sub-pool lacks compute capacity sufficient to execute the first program code;

in response to determining that the second sub-pool lacks compute capacity sufficient to execute the first program code, determine that a policy associated with the second sub-pool allows the virtual compute system to wait for additional compute capacity sufficient to execute the first program code to become available;

in response to determining that the policy allows the virtual compute system to wait, wait for additional compute capacity sufficient to execute the first program code to become available in the second sub-pool;

cause a first virtual machine instance in the second sub-pool having compute capacity sufficient to execute the first program code to be added to the active pool; and cause the first program code to be executed, using the one or more parameters, in a container created on the first virtual machine instance.

2. The system of claim 1, wherein the virtual machine instances in the second sub-pool are implemented using computer hardware that is not used for implementing the virtual machine instances in the first sub-pool.

3. The system of claim 1, wherein a size of the second sub-pool is automatically adjusted based on a user policy associated with the first user account.

4. The system of claim 1, wherein the virtual compute system is further configured to acquire a first set of virtual machine instances to be added to the first sub-pool from a first source at a fixed cost, and a second set of virtual machine instances to be added to the second sub-pool from a second source at a variable cost.

5. The system of claim 1, wherein the virtual compute system is further configured to:

receive a request to execute a second program code of a second user account different from the first user account, the request to execute the second program code including an identity associated with the second user account and one or more parameters for executing the second program code;

determine, based on a determination that the identity included in the request to execute the second program code does not correspond to the identity associated with the first user account, that the second program code is to be executed using compute capacity provided by one of the virtual machine instances in the first sub-pool;

cause a second virtual machine instance in the first sub-pool having compute capacity sufficient to execute to the second program code to be assigned to the second user account and added to the active pool; and cause the second program code to be executed, using the one or more parameters included in the request to execute the second program code, in a container created on the second virtual machine instance.

6. A system for providing low-latency computational capacity, the system comprising:

a virtual compute system comprising one or more hardware computing devices executing specific computer-executable instructions and configured to at least:

maintain a plurality of virtual machine instances on one or more physical computing devices, wherein the plurality of virtual machine instances comprises:

a first pool comprising virtual machine instances assigned to a first user account before a request associated with the first user account is received by the virtual compute system; and a second pool comprising virtual machine instances executing one or more program codes thereon;

receive the request to execute a first program code using compute capacity provided by one of the plurality of virtual machine instances, the request including first user account information and one or more parameters for executing the first program code;

determine, based on the first user account information, that the first program code is to be executed using compute capacity provided by a virtual machine instance in the first pool;

determine that the first pool lacks compute capacity sufficient to execute the first program code;

in response to determining that the first pool lacks compute capacity sufficient to execute the first program code, determine that a policy associated with the first pool allows the virtual compute system to wait for additional compute capacity sufficient to execute the first program code to become available;

in response to determining that the policy allows the virtual compute system to wait, wait for additional compute capacity sufficient to execute the first program code to become available in the first pool;

cause a first virtual machine instance in the first pool having compute capacity sufficient to execute the first program code to be added to the second pool; and cause the first program code to be executed, using the one or more parameters, in a container created on the first virtual machine instance.

7. The system of claim 6, wherein the plurality of virtual machine instances further comprises a third pool comprising virtual machine instances, wherein the virtual machine instances in the first pool are implemented using computer hardware that is not used for implementing the virtual machine instances in the third pool.

8. The system of claim 6, wherein the virtual compute system is further configured to automatically acquire additional virtual machine instances to be added to the first pool from an instance provisioning service based on a user policy associated with the first user account.

9. The system of claim 6, wherein the virtual compute system is further configured to add the first virtual machine instance back to the first pool after the execution of the first program code is completed.

10. The system of claim 6, wherein the virtual compute system is further configured to process a request to cause a new pool of virtual machine instances associated with the first user account to be included in the plurality of virtual machine instances, the request to cause the new pool to be included including one or more criteria for adding one or more second virtual machine instances to the new pool.

11. The system of claim 10, wherein the one or more criteria comprise at least one of the first user account, an identity of the request, an identity of the one or more second virtual machine instances, or a configuration associated with the one or more second virtual machine instances.

12. The system of claim 6, wherein the plurality of virtual machine instances further comprises a third pool comprising virtual machine instances, wherein the virtual compute system is further configured to acquire a first set of virtual machine instances to be added to the third pool from a first source at a fixed cost, and a second set of virtual machine instances to be added to the first pool from a second source at a variable cost.

13. The system of claim 6, wherein the plurality of virtual machine instances further comprises a third pool comprising virtual machine instances, the virtual compute system further configured to:
- receive a request to execute a second program code of a second user account different from the first user account, the request to execute the second program code including second user account information and one or more parameters for executing the second program code;
- determine, based on the second user account information, that the second program code is to be executed using one of the virtual machine instances in a third pool of virtual machine instances waiting to be assigned to one of the plurality of user accounts of the virtual compute system;
- cause a second virtual machine instance in the third pool having compute capacity sufficient to execute the second program code to be assigned to the second user account and added to the second pool; and
- cause the second program code to be executed, using the one or more parameters included in the second request, in a container created on the second virtual machine instance.

14. A computer-implemented method comprising:
- as implemented by one or more computing devices configured with specific executable instructions,
  - maintaining a plurality of virtual machine instances on one or more physical computing devices, wherein the plurality of virtual machine instances comprises:
    - a first pool comprising virtual machine instances assigned to a first user account before a code execution request associated with the first user account is received by the virtual compute system; and
    - a second pool comprising virtual machine instances executing one or more program codes thereon;
  - receiving the request to execute a first program code using compute capacity provided by one of the plurality of virtual machine instances, the request including first user account information and one or more parameters for executing the first program code;
  - determining, based on the first user account information, that the first program code is to be executed using compute capacity provided by a virtual machine instance in the first pool;
  - determining that the first pool lacks compute capacity sufficient to execute the first program code;
  - in response to determining that the first pool lacks compute capacity sufficient to execute the first program code, determining that a policy associated with the first pool allows the virtual compute system to wait for additional compute capacity sufficient to execute the first program code to become available;
  - in response to determining that the policy allows the virtual compute system to wait, waiting for additional compute capacity sufficient to execute the first program code to become available in the first pool;
  - causing a first virtual machine instance in the first pool having compute capacity sufficient to execute the first program code to be added to the second pool; and
  - causing the first program code to be executed, using the one or more parameters, in a container created on the first virtual machine instance.

15. The method of claim 14, wherein the plurality of virtual machine instances further comprises a third pool comprising virtual machine instances, wherein the virtual machine instances in the first pool are implemented using computer hardware that is not used for implementing the virtual machine instances in the third pool.

16. The method of claim 14, further comprising automatically acquiring additional virtual machine instances to be added to the first pool from an instance provisioning service based on a user policy associated with the first user account.

17. The method of claim 14, further comprising adding the first virtual machine instance back to the first pool after the execution of the first program code is completed.

18. The method of claim 14, further comprising processing a request to cause a new pool of virtual machine instances associated with the first user account to be included in the plurality of virtual machine instances, the request to cause the new pool to be included including one or more criteria for adding one or more second virtual machine instances to the new pool.

19. The method of claim 18, wherein the one or more criteria comprise at least one of the first user account, an identity of the request, an identity of the one or more second virtual machine instances, or a configuration associated with the one or more second virtual machine instances.

20. The method of claim 14, wherein the plurality of virtual machine instances further comprises a third pool comprising virtual machine instances, the method further comprising acquiring a first set of virtual machine instances to be added to the third pool from a first source at a fixed cost, and a second set of virtual machine instances to be added to the first pool from a second source at a variable cost.

21. The method of claim 14, wherein the plurality of virtual machine instances further comprises a third pool comprising virtual machine instances, the method further comprising:
- receiving a request to execute a second program code of a second user account different from the first user account, the request to execute the second program code including second user account information and one or more parameters executing the second program code;
- determining, based on the second user account information, that the second program code is to be executed using one of the virtual machine instances in a third pool of virtual machine instances waiting to be assigned to one of the plurality of user accounts of the virtual compute system;
- causing a second virtual machine instance in the third pool having compute capacity sufficient to execute the second program code to be assigned to the second user account and added to the second pool; and
- causing the second program code to be executed, using the one or more parameters included in the second request, in a container created on the second virtual machine instance.

* * * * *